United States Patent
Ishibashi et al.

[19]

[11] Patent Number: 6,141,164
[45] Date of Patent: Oct. 31, 2000

[54] DATA RECORDING/REPRODUCING APPARATUS EMPLOYING READ-AFTER-WRITE SYSTEM

[75] Inventors: Hiroshi Ishibashi; Toshiyuki Hirose, both of Tokyo; Shinya Ozaki, Kanagawa, all of Japan

[73] Assignee: Sony Corporation, Tokyo, Japan

[21] Appl. No.: 08/671,330

[22] Filed: Jun. 27, 1996

[30] Foreign Application Priority Data

Jun. 30, 1995 [JP] Japan ................................. 7-166707
Nov. 16, 1995 [JP] Japan ................................. 7-298550

[51] Int. Cl.[7] .............................. G11B 5/09; G06F 11/00; H03M 13/00
[52] U.S. Cl. ......................... 360/53; 714/704; 714/758; 714/805
[58] Field of Search ............................. 360/53; 371/5.1, 371/47.1, 37.1, 22.1, 21.2, 37.7; 714/724, 719, 798, 758, 805

[56] References Cited

U.S. PATENT DOCUMENTS 4,849,979  7/1989  Maccianti et al. .................. 714/41
5,359,468  10/1994  Rhodes et al. ........................ 360/53

FOREIGN PATENT DOCUMENTS

0176218  4/1986  European Pat. Off. .

*Primary Examiner*—Paul Loomis
*Assistant Examiner*—Regina Y. Neal
*Attorney, Agent, or Firm*—Jay H. Maioli

[57] ABSTRACT

A recording apparatus provided on, for example, a digital audio tape recorder or on a data storage device for correctly and reliably recording data. An ECC unit 23 appends the parity for error correction to recording data and transmits the resulting data to recording heads Hw1, Hw2, while recording the parity in a RAM 61. The recording data and the parity are reproduced from a magnetic tape 32 by magnetic heads Hr1, Hr2 and supplied to a subcode separation unit 45. A syndrome detection unit 62 detects the number of error corrections performed by parity by an error correction unit 46. A system controller 63 compares the number of times of error corrections to a threshold value and compares the parity read out from the RAM 61 to the parity from the sub-code separation unit 45 in order to detect if the recording data has been recorded correctly. If the recording data has not been recorded correctly, the system controller controls a recording/reproducing unit 30 for re-recording the same recording data.

12 Claims, 8 Drawing Sheets

FIG.1A (PRIOR ART)
TRACK FORMAT

FIG.1B (PRIOR ART)
PCM BLOCK

FIG.1C (PRIOR ART)
SUB-CODE BLOCK

DATA RECORDING/REPRODUCING APPARATUS EMPLOYING READ-AFTER-WRITE SYSTEM

BACKGROUND OF THE INVENTION

1. Field of the Invention

This invention relates to a recording apparatus such as, for example, a digital audio tape recorder or a data storage device for performing reliable data recording.

2. Description of the Related Art

There has hitherto been know a data storage device for recording data supplied from an information processing apparatus, such as a personal computer or a workstation, on a magnetic tape. With such a data storage device, a rotary head is used for recording data on a recording track inclined relative to the tape's running direction for improving the data recording density. There has also been known a digital audio tape recorder (DAT) in which, a rotary head is used for recording/reproducing speech as digital data on a recording track inclined relative to the tape's running direction.

With the data storage device or DAT, so-called product codes (parity data) are appended as error correction codes when recording data in order to improve data reliability.

Figure 1A:
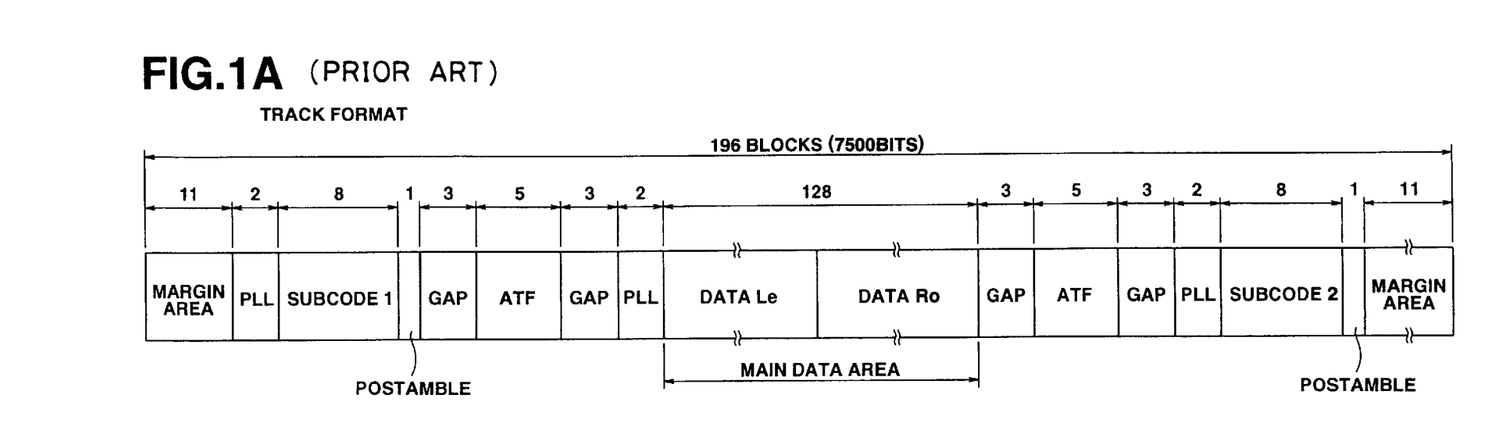
FIGS. 1A to 1C illustrate a recording format for one-track data recorded on a magnetic tape by a conventional DAT.

With such DAT, 196 blocks of data are recorded in each track, as shown for example in FIG. 1A. In such a recording track, 11 blocks of margin areas are provided on both ends thereof and, between these margin areas, there are provided eight blocks each of first and second sub-code areas for recording sub-codes, five blocks each of two ATF areas for recording automatic track finding (ATF) signals for effecting tracking control and 128 blocks of a main data area for recording data.

Figure 1B:
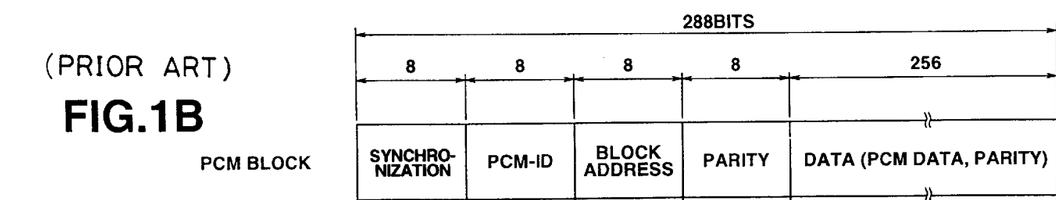

The sub-code area and the main data area are each made up of blocks made up of 288 bits. Each block defining the main data area is made up of an 8-bit synchronization signal, main IDs (W1 and W2) each composed of 8 bits, 8-bit parity data and 356-bit PCM data, as shown in FIG. 1B. In each of the main IDs (W1 and W2), there are recorded a PCM (pulse code modulation)-ID for specifying the quantization methods for speech signals and block addresses for identifying respective blocks.

Figure 1C:
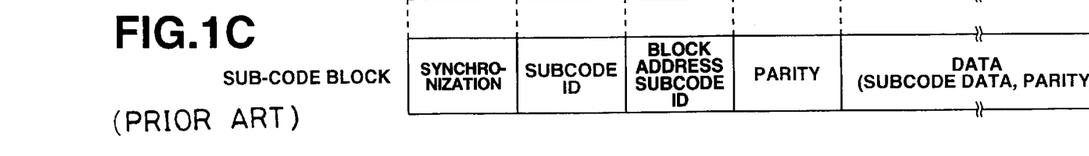

Each block defining the subcode area is made up of an 8-bit synchronization signal, sub-IDS (W1, W2) each made up of 8-bits, a parity code of 8 bits, and subcode data of 256 bits, as shown in FIG. 1C. In the sub-IDs (W1, W2) are recorded the sub-code ID specifying the types of the sub-code, block addresses for specifying the blocks, and the sub-code ID.

The main data, temporally continuously supplied from an external audio apparatus or the like so as to be recorded in each block of the main data area, is interleaved, that is, re-arrayed, before appendage of error correction codes.

By performing the interleaving before recording, if data failure is produced in succession in data of respective blocks due to dropout in the magnetic tape during reproduction, data dropout may be temporally distributed in the ultimately reproduced speech data.

With the above DAT, it is possible to perform a so-called read-after-write operation of sequentially reproducing a recorded track for comparison with recorded data. When performing such a read-after-write operation, the number of times error correction is performed on the reproduced data using the parity data recorded as described above, referred to hereinafter, as the number of syndrome occurrences, is detected, and the number of syndrome occurrences is compared to a pre-set threshold value. If the number of syndrome occurrences exceeds the pre-set threshold value, the same data is again recorded. This enables data to be correctly recorded on the magnetic tape.

However, when performing such a read-after write operation, there are occasions wherein recording becomes infeasible due to head clogging, in which magnetic particles become affixed to the head gap of the magnetic head which renders recording impossible. If, in such case, a previously recorded recording track is left on the magnetic tape, the reproducing head reproduces the previously recorded recording track. The result is that, if the number of syndrome occurrence is less than the above threshold value, it may be judged through error that correct recording has been made, even although no recording has actually been made.

It may be contemplated to reproduce the data recorded on a magnetic tape and to correct errors in all the reproduced data in order to corroborate whether all the data has been corrected for errors. Since error correction needs to be performed on all the data, corroboration of the recorded data becomes extremely time-consuming.

It may also be contemplated to store all the data recorded on a magnetic tape and to compare the stored data to the reproduced data. In this case, a large storage unit is required for storing the recorded data, so that comparison of all the data becomes similarly time-consuming.

It may likewise be contemplated to correct only part of the recorded data for effecting high-speed recording in order to corroborate whether recording has been made correctly. In this case, it is impossible to detect errors produced in areas other than those where error correction has been performed, thus lowering reliability.

SUMMARY OF THE INVENTION

It is therefore an object of the present invention to provide a recording apparatus in which a read-after-write operation is used to improve reliability for enabling correct data recording.

In one aspect, the present invention provides a data recording/reproducing apparatus including recording means for recording recording data and parity data for the recording data on a recording medium, parity storage means for storing the parity data recorded on the recording medium, and reproducing means for reproducing the recording data and the parity data recorded on the recording medium. The data recording/reproducing apparatus also includes error correction means for correcting the reproduced recording data for errors using the parity data, detection means for detecting the number of times error correction has been performed for the reproduced recording data by the error correction means after the recording data and the parity data is recorded by the recording means at the time of data recording, and recording confirming means for comparing the detected number of times error correction has ben performed to a pre-set threshold value and for comparing the reproduced parity to the parity stored in the parity storage means in order to detect whether the recording by the recording means has been done correctly. The data recording/reproducing apparatus additionally includes re-recording controlling means for controlling the recording means so that, if the recording confirming means does not detect that the recording by the recording means has been done correctly, the same recording data is re-recorded by the recording means.

In another aspect, the present invention provides a data recording/reproducing apparatus including recording means for recording recording data and parity data for the recording data on a tape-shaped recording medium, parity storage means for storing the parity data recorded on the tape-shaped recording medium, reproducing means for reproducing the recording data and the parity data recorded on the tape-shaped recording medium, means for correcting the reproduced recording data for error using the parity data, detection means for detecting the number of errors corrected by the error correction means after recording the recording data and the parity data are recorded by the recording means at the time of data recording, recording confirming means for comparing the detected number of errors to a pre-set threshold value and for comparing the reproduced parity data to the parity data stored in the parity storage means for detecting that the recording by the recording means has been done correctly, and re-recording controlling means for controlling the recording means so that, if the recording confirming means does not determine that the recording by the recording means has been done correctly, the same recording data will be re-recorded by the recording means.

With the recording apparatus of the present invention, the number of errors in the recording data or the number of times an error correction operation occurs is detected using the reproduced parity data and compared to a pre-set threshold value, while the parity data recorded in the parity storage means is compared to the reproduced parity, at the recording time, in order to detect if recording has been done correctly. If recording has not ben done correctly, the same recording data is recorded again. This improves the reliability in recording the recording data.

DESCRIPTION OF THE PREFERRED EMBODIMENTS

Referring to the drawings, preferred embodiments of the present invention will be explained in detail.

In the present embodiment, the reproducing device of the present invention is applied to a data storage device for recording/reproducing data from an information processing device, such as a personal compute or a work station, on or form a magnetic tape.

Figure 2:
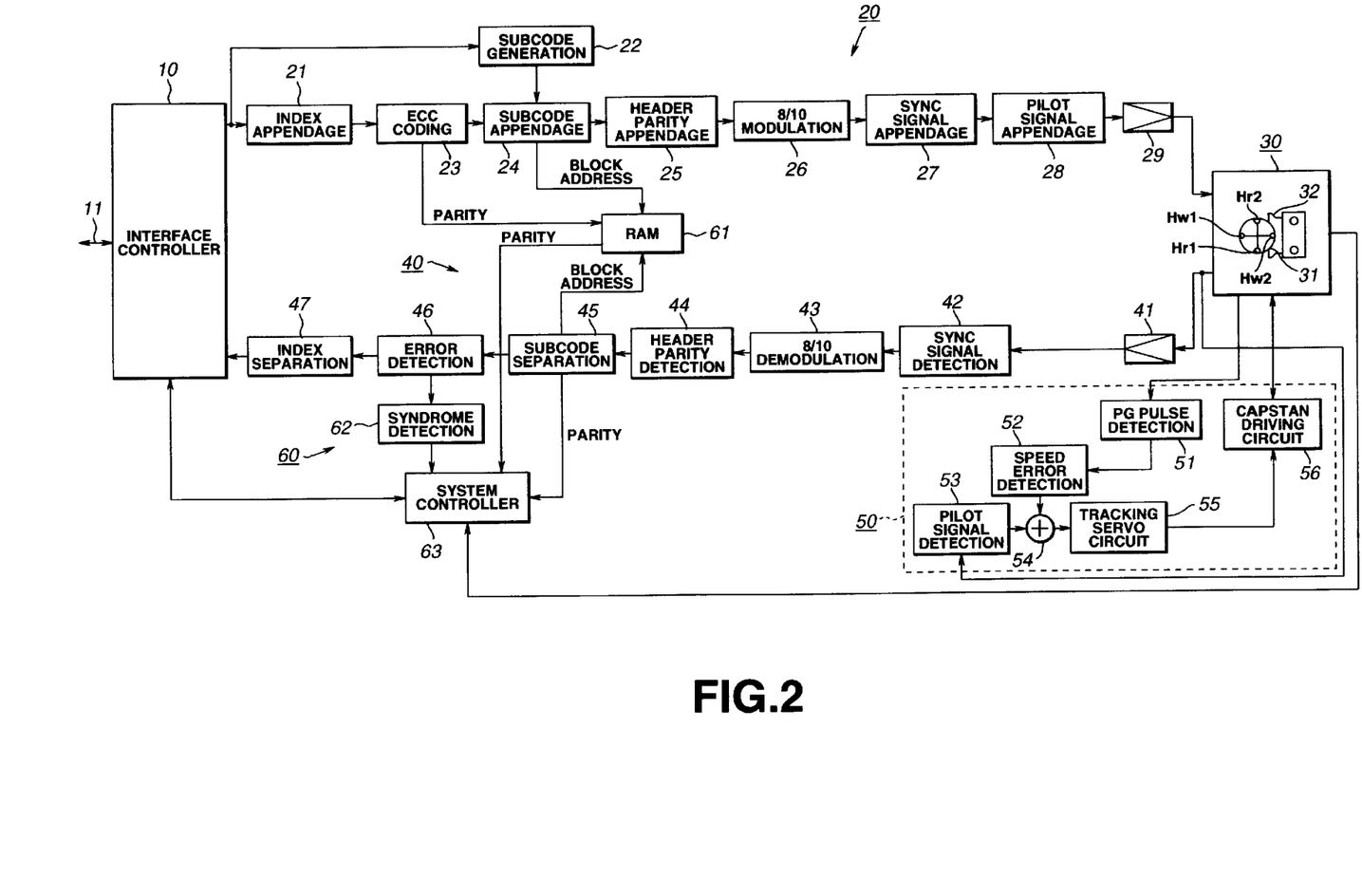
FIG. 2 is a block diagram showing an arrangement of an embodiment of a reproducing apparatus of the present invention as applied to a data storage device.

The present data storage device includes an interface controller 10 for effecting data exchange with an outside source, a recording data processing system 20 for processing data entering the interface controller 10 for converting the data to data of a pre-set format, and a recording/reproducing unit 30 for recording a signal supplied from the recording data processing system 20 and for reproducing the recorded data on or from the magnetic tape, as shown in FIG. 2. The data storage device also includes a playback data processing system 40 for processing the playback output of the recording/reproducing unit 30 for reproducing data recorded on the magnetic tape, and a tracking control system 50 for controlling the tape running system of the recording/reproducing unit 30. The data storage device additionally includes a data recording control unit 60 for controlling the recording of data on the magnetic tape.

The interface controller 10 is comprised of a small computer system interface (SCSI) and is configured for supplying data from the information processing devices, such as external personal computer or workstation, to the recording data processing system 20, and for supplying the recording data reproduced by the playback data processing system 40 to the information processing device.

The recording data processing system 20 includes an index appendage circuit 21 for appending the index information to the recording data supplied via interface controller 10, and a subcode generator 22 for generating sub-codes. The recording data processing system 20 also includes an error correction code generator 23 (ECC unit) for error detection and correction of the recorded data from the index appendage circuit 21 and a subcode appendage circuit 24 for appending the sub-codes and a block address from the subcode generator 22 to the recorded data which has been corrected for detected errors.

The recording data processing system 20 includes a header parity appendage unit 25 for appending header parity data to the recording data from the subcode appendage unit 24, and an eight-to-ten (8/10) modulation unit 26 for modulating the recording data from the header parity appendage unit 26 with 8/10 modulation. The recording data processing system 20 also includes a synchronization signal appendage unit 27 for appending the synchronization signal to the recording data supplied form the 8/10 modulation unit, and a pilot signal appendage unit 28 for appending pilot signals for ATF (automatic track finding) for tracking control to the recording data supplied from the synchronization signal appendage unit 27. The recording data processing system 20 additionally includes an amplifier 29 for amplifying the recording data supplied from the pilot signal appendage unit 28.

The recording/reproducing unit 30 includes a rotary drum 31 adapted for rotating two recording magnetic heads Hw1, Hw2 having different azimuth angles and two reproducing magnetic heads Hr1, Hr2 having a different azimuth angles. These two pairs of magnetic heads Hw1, Hw2, Hr1, Hr2 are arranged diametrically opposite to each other on the circumference of the rotary drum 31. The reproducing magnetic head Hr1 is mounted at a position 90° behind the recording magnetic head Hw1 along the direction of rotation of the rotary drum 31.

The playback data processing system 40 includes an amplifier 41 for amplifying the playback output of the inclined track of the magnetic tape 32 supplied from the recording/reproducing unit 30, and a synchronization signal detection unit 42 for detecting the synchronization signal from the playback output supplied from the amplifier 41, converting the playback output into bi-level signals, correcting the bi-level signal with respect to jitter and outputting the resulting signal. The playback data processing system 40 also includes an 8/10 demodulation unit 43 for demodulating the reproduced bi-level signal from the synchronization signal detection unit 42 with eight-to-ten (8/10) demodulation, and a header parity check unit 44 for checking the header parity data of the reproduced data from the 8/10 demodulation unit 43.

The playback data processing system 40 also includes a subcode separation unit 45 for separating the sub-codes from the reproduced data from the head parity check unit 44, and an error correction unit 46 for error correction of the reproduced data from the subcode separation unit 45 freed of the sub-codes. The playback data processing system 40 also includes an index separation unit 47 for separating the index from the reproduced data which has been corrected for errors by the error correction unit 46.

The tracking control system 50 includes a PG detection unit 51 supplied with PG pulses from the recording/reproducing unit 30 corresponding to the rotation of the rotary drum 31, and a speed error detection unit 52 for detecting speed errors from a detection output of the PG detection unit 51. The tracking control system 50 also includes a pilot signal detection unit 53 for detecting an ATF pilot signal from the reproduced output of the recording/reproducing unit 30, and an adder 54 for summing detection outputs of the speed error detection unit 52 and the pilot signal detection unit 53. The tracking control system 50 further includes a tracking servo circuit 55 for generating a tracking servo signal based on the sum output of the adder 54 and a capstan driving circuit 56 for controlling the tape running system of the recording/reproducing unit 30.

The data recording control unit 60 includes a RAM 61 for storing the C1 parity appended to each block associated with the block address from the subcode appendage unit 24, and a syndrome detection unit 62 for detecting the number of times the correction of the header parity data is performed by the error correction unit 46, that is the number of syndrome occurrences. The data recording control unit 60 also includes a system controller 62 for comparing a data string of the C1 parity data of a reproduced block and the as-recorded data string of the C1 parity data stored in the RAM 61 for controlling the operation of the recording/reproducing unit 30.

With the present data storage device, the magnetic tape 42 is run at a pre-set running speed during recording/reproduction. The running speed of the magnetic tape is set so that two recording tracks of the magnetic tape are traversed during one complete revolution of the rotary drum. If data is recorded in this state, recording tracks $T_A$, $T_B$ are alternately formed at an interval of one track pitch $T_P$ by the magnetic heads Hw1, Hw2 having an interval equal to $T_P$ along the track width, as shown in FIG. 4. Since the magnetic heads Hw1, Hw2 are of different azimuth angles, the recording tracks $T_A$, $T_B$ differ in azimuth angles. These two recording tracks $T_A$, $T_B$ are hereinafter referred to as one frame.

Figure 3:
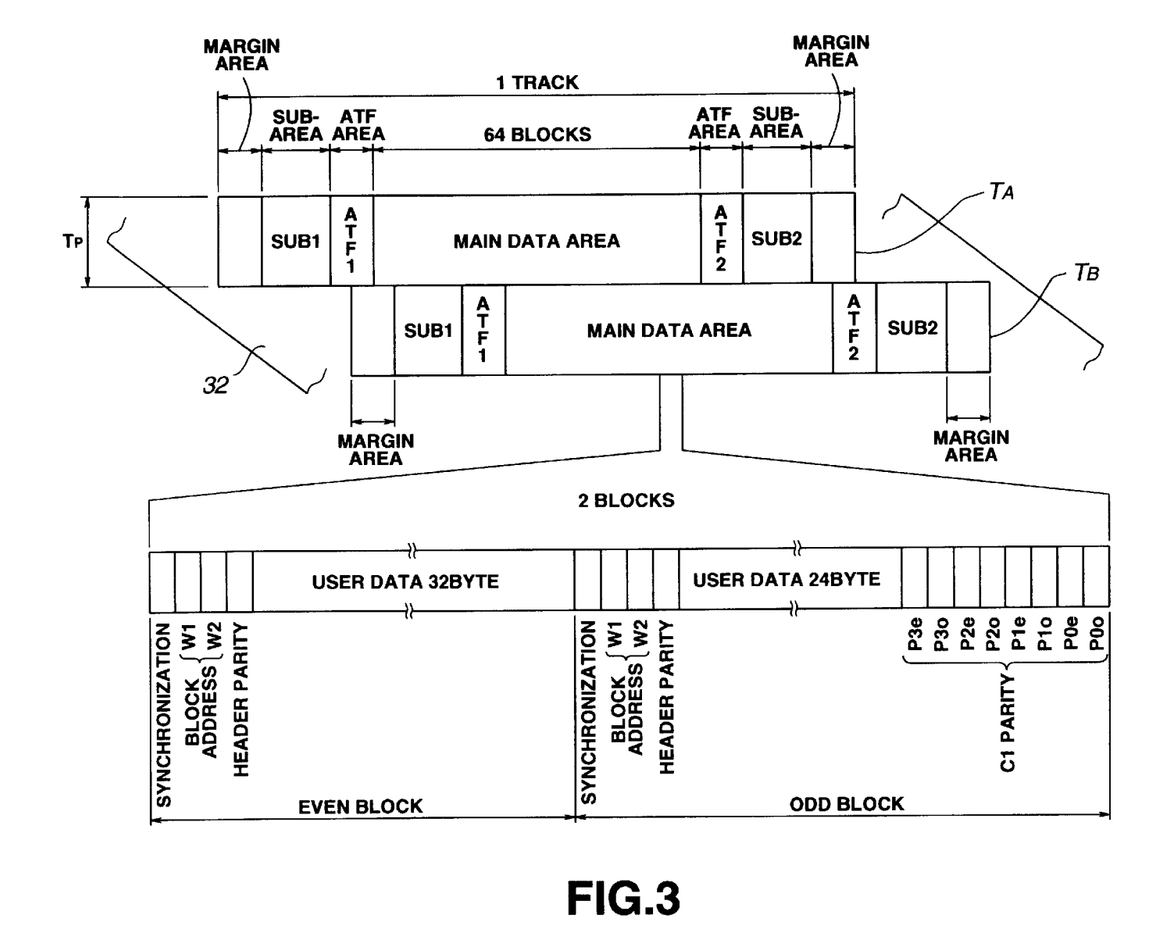
FIG. 3 illustrates an arrangement of a recording track recorded on a magnetic tape by the data storage device shown in FIG. 1.

Each of the recording tracks $T_A$, $T_B$ is made up of a main data area for recording the recording data, an ATF area for recording pilot signals for ATF, referred to hereinafter as ATF signals, a sub-area for recording sub-IDS or sub-data, and a margin area, as shown in FIG. 3. The ATF area, sub-area and the margin area are provided on both ends of the main data area. Each track is made up of a margin area, a sub-area, an ATF area, a main data area, an ATF area, a main data area, a sub-area and a margin area in this order.

The data storage device is adapted for recording 64 blocks in the main data area. In the data of these blocks, C1 parity data is appended every two blocks by the ECC unit. Specifically, 32-byte user data is recorded in the even-numbered blocks in the main data area, while 24-byte user data and 8-byte C1 parity data $Po_e$, $Po_o$, $P1_e$, $P1_o$, $P2_e$, $P3_e$, $P3_o$ for user data of these two blocks are recorded in the odd-numbered blocks in the main data area.

To each block are appended a 1-byte synchronization signal, 2-byte block addresses W1, W2 and 1-byte header parity data, which is the header parity data for these block addresses.

The operation of the data storage device is now explained. In the present data storage device, recording data is supplied for recording from the information processing device, such as a personal computer or a workstation, via the interface controller 10. When supplied with the recording data over bus 11, the interface controller 10 transmits the recording data supplied thereto to the index appendage unit 21 and to the sub-code generation unit 22.

When supplied with recording data from the interface controller 10, the index appendage unit 21 appends the indexing information to the supplied recording data in terms of 44 tracks or 22 frames as a unit and transmits the resulting data to the ECC unit 23. The indexing information is used for discriminating a series of data.

The ECC unit 23 generates an error correction code C3 of a data string associated with the track width direction for each unit of the recording data supplied from the index appendage unit 21, and appends the error correction code C3 to the 22-frame recording data. In addition, the ECC unit 23 generates the error correction code C1 block by block and appends the error correction code C1 to the block data, while generating the error correction code C2 of a data string associated with the track direction, splitting the error correction code C2 into two and allocating these two portions to both end portions of the main data area of each track. The ECC unit 23 routes the C1 parity data to the RAM 61.

The sub-code generating unit 22 generates, on the basis of the recording data supplied via the interfacing controller 10, a separator count, which is the demarcation information specifying the demarcation of the recording data, a record count specifying the number of records, area IDs specifying respective areas defined on the tape format, frame numbers, group counts specifying the number of recording units, checksum and the block address of the respective blocks. The sub-code generating unit 22 generates system log (hysteresis information) for each of the partitions P1 and P0 defined on the tape format.

The sub-code appendage unit 24 appends block address supplied from the subcode generating unit 22 to the recording data to which the error correction codes C3, C2, and C1 have been appended by the ECC unit 23. The sub-code appendage unit 24 constitutes sub-data from the count value, area IDS, group count and the check sum, generated by the sub-code generating unit 22, and allocates the sub-data to each block of the two sub-areas. The sub-code appendage unit 24 routes the block addresses as write addresses to the RAM 61. In this manner, the C1 parity data supplied from the ECC unit 23 to the RAM 61 is stored in areas associated with the block addresses in the RAM 61.

The header parity appendage unit 25 generates a 1-byte header parity data for error detection for the block addresses appended to the recording data by the sub-code appendage unit 24, and appends the 1-byte header parity data to the recording data. This allocates the 1-byte header parity data to the recording data. This allocates the 1-byte header parity directly behind the block address of each block.

The 8/10 modulation unit 26 converts the recording data of each block of the two sub-areas and the recording data of the main data area, to which header parity data ha been appended by the header parity appendage unit 25, from 8 bits to 10 bits, on the byte basis, so that the dc level of the recording signal will be maintained at substantially zero level.

The synchronization signal appendage unit 27 appends the synchronization signal block by block to the heading end of the recording data converted into 1-bit data by the 8/10 modulation unit 26. The resulting recording data is supplied to the pilot signal appendage unit 28.

The pilot signal appendage unit 28 generates the pilot signal for ATF and appends it to the recording data. The resulting signal is supplied to the magnetic heads Hw1, Hw2. This causes the magnetic heads Hw1, Hw2 to scan the magnetic tape for recording so that a recording track as shown in FIG. 3 is formed. With the present data storage device, when the magnetic tape, recorded as described above, is reproduced, the recording/reproducing unit 30 controls the rotation of the rotary drum 31 so that the number of revolutions of the rotary drum will be equal to that at the time of recording. The recording/reproducing unit 30 also controls the running of the magnetic tape 32 so that he magnetic tape 32 will travel at a constant speed. Thus the magnetic heads Hr1, Hr2 for reproduction scan the magnetic tape along a tilted path and supply a playback output corresponding to the scanning of the recording track to the synchronization signal detection unit 42 via amplifier 41. The synchronization signal detected unit 42 detects the synchronization signal from the playback output supplied thereto.

The playback output is converted into a bi-level signal by clocks synchronized with the synchronization signal to generate playback data which is supplied to the 8/10 demodulation unit 43.

The 8/10 demodulation unit 43 converts the playback data from the synchronization signal detection unit 42 from 10-bit data into 8-bit data which is supplied to the header parity detection unit 44. The header parity detection unit 44 performs a parity check of the block address using the 1-byte header parity. The subcode separation unit 45 transmits the block data of the main data area having the correct block address as parity-checked by the header parity detection unit 44 to the error correction unit 46. The sub-code separation unit 45 also separates the sub-code from the block of the sub-area and transmits the separated sub-code to the system controller 63.

The sub-code separation unit 45 routes the block address of the main data area to the RAM 61. This causes the parity data associated with the block address supplied from the RAM 61 to be read out and routed to the system controller 63.

The error correction unit 46 corrects the playback data of the respective blocks from the sub-code separation unit 45 for errors, using the C1 parity data appended on the block basis, while correcting the data string associated with the track direction for errors, using the C2 parity data appended to each end of the playback data area of each track. The error correction unit 46 also corrects the data string associated with the track width direction for errors, using the C3 parity data allocated every group or every 22 frames.

If a correctable error is produced in the data of the reproduced block, as indicated by the syndrome, the error correction unit 46 apprises the syndrome detection unit 62 that error correction has been made using the C1 parity data. The syndrome detection unit 62 detects the number of times syndrome generation occurs during reproduction of the blocks corresponding to one track and routes the detected number of syndrome occurrences to the system controller 63.

Since the playback data is corrected for errors in this manner, using the error correction codes C1, C2 and C3, the playback data can be reliably corrected for errors, thus improving reliability of the playback data.

The index separation unit 47 separates the index information from the playback data which has been corrected for errors by the error correction unit 46 and routes the separated index information to the system controller 63. The playback data, freed of the index information, is routed to the interface controller 10.

The interface controller 10 transmits the playback data from the index separation unit 47 to, for example, the personal computer or to the workstation.

The data storage device is capable of performing the so-called read-after-write operation of comparing the recording track recorded by the magnetic heads Hw1, Hw2 to data sequentially reproduced and recorded by the magnetic heads Hr1, Hr2.

Figure 4A:
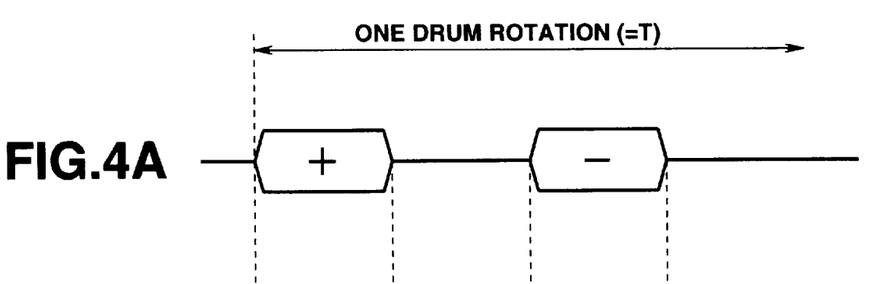
FIGS. 4A and 4B illustrates a timing for recording and reproduction for a magnetic head at the time of recording on a magnetic tape by the data storage device shown in FIG. 1.
Figure 4B:
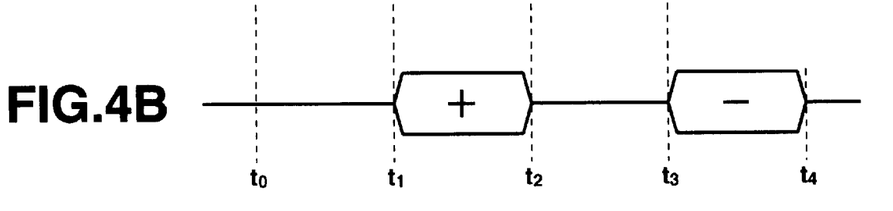

The recording heads Hw1, Hw2, Hr1, Hr2 are formed at an interval of 90° on the circumference of the rotary drum 31, as shown in FIG. 2, so that, when such read-after write recording is performed, reproduction the by magnetic heads Hr1, Hr2 is started, as shown in FIG. 4B, substantially simultaneously with the end of the recording by the magnetic head Hw1 or Hw2, as shown in FIG. 4A. The waveforms shown by (+) and (−) in FIG. 4A denote recording by the magnetic heads Hw1, Hw2, while the waveforms shown by (+) and (−) in FIG. 4B denote reproduction by the magnetic heads Hr1, Hr2, respectively.

The system controller 63 compares the number of occurrences of syndromes during reproduction of one-track blocks supplied from the syndrome detection unit 62 to a pre-set threshold value. If the number of occurrences of syndromes is larger than the threshold value, the system controller judges that the recording track has not been recorded correctly and hence controls the recording/reproducing unit 30 to re-record the data on the recording track.

The threshold value is set to, for example, 64. There are recorded 64 blocks in the main data area of the recording track, while there are recorded four blocks in each of two sub-areas, so that 72 blocks are recorded in each track. Thus, with the present data storage device, if not less than 64 of the 72 blocks are correctly recorded, and the remaining blocks are correctable for errors using the C1 parity data, it is assumed that data recording has been done correctly.

If the number of occurrences of syndromes is not larger than the threshold value, there is a possibility that the data previously recorded on the magnetic tape has been left unerased. Thus the system controller 63 judges whether or not the as-recorded parity data read out from the RAM 61 is association with the block addresses coincide with the reproduced parity data. If the as-recorded parity data coincides with the reproduced parity data, it is assumed that the recording track has been recorded correctly so that data recording is continued. If otherwise, it is assumed that the recording track has not been recorded correctly, so that the system controller controls the recording/reproducing unit 30 and so forth to re-record the data on the recording track.

Figure 5:
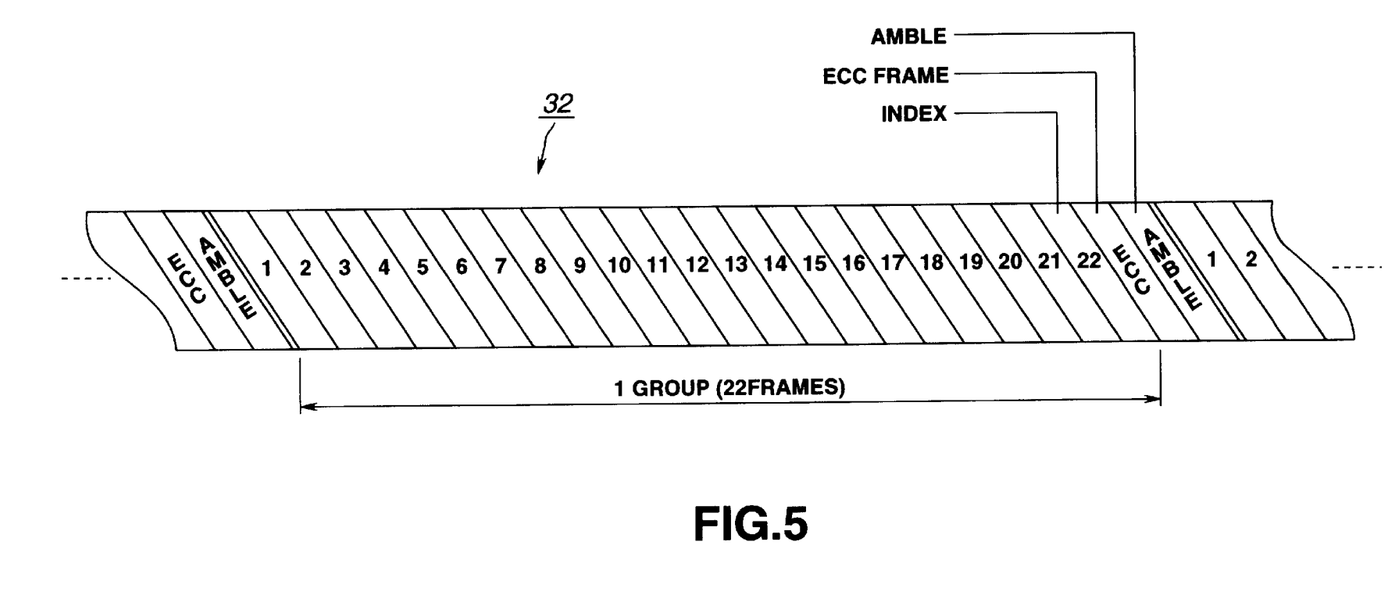
FIGS. 5 to 7 illustrate data configurations for one unit of 46 tracks of data recorded on a magnetic tape by the data storage device of FIG. 1.
Figure 6:
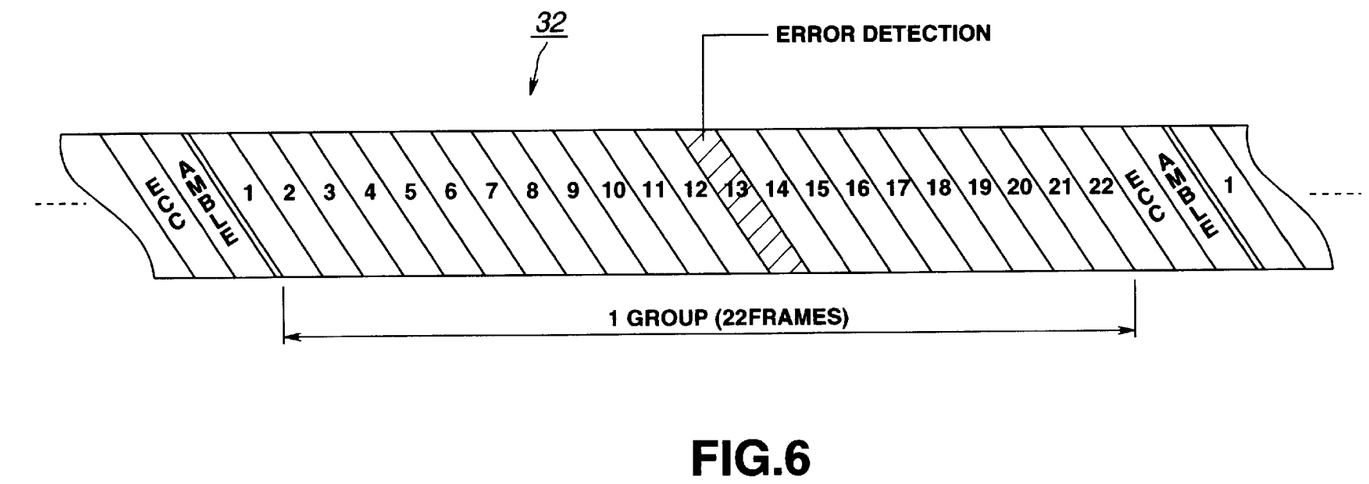
Figure 7:
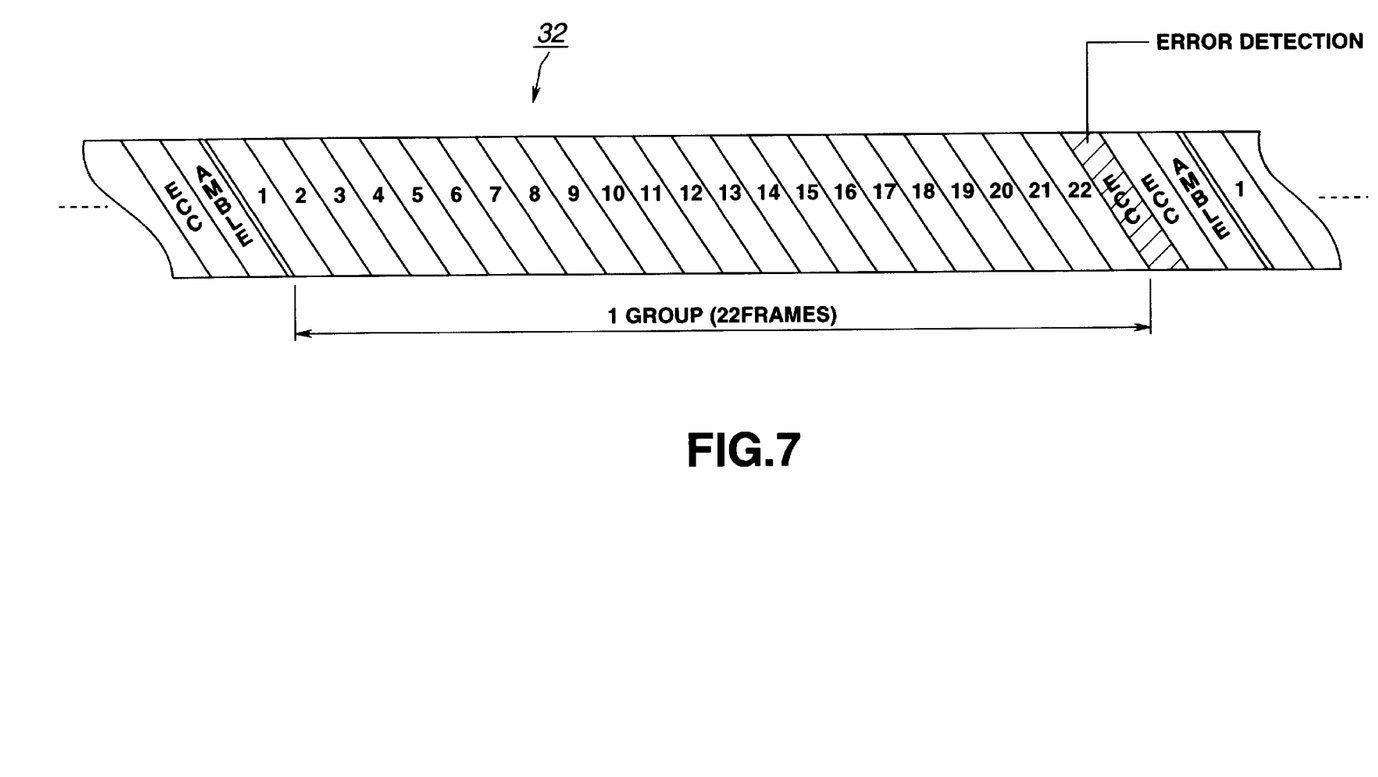

If it is assumed that one-group data corresponding to a 22-frame recording track and one ECC frame appended thereto for recording the C3 parity data is recorded, as shown in FIG. 5, and the recording of the recording track of the 13$^{th}$ frame in the group has not been done correctly, as shown n FIG. 6, data of the 13$^{th}$ and following frames are recorded in the subsequent frames. If recording of the recording track of the ECC frame has not been done correctly, as shown for example in FIG. 7, the C3 frame is re-recorded in the subsequent frame. In this manner, the data of the respective frames can be recorded correctly.

When performing such read-after-write operation, there are occasions wherein head clogging is produced only in the recording head, such that recording becomes totally infeasible. If previously recorded recording tracks are left on the magnetic tape, the reproducing head reproduces the previously recorded tracks.

If, in such case, the recording state of each recording track is judged using only the number of occurrences of syndromes on reproduction of the recorded recording tracks, and the number of occurrences of syndromes at the time of reproduction of the data recorded in each recording track is less than the above threshold value, mistaken judgement that correct recording has been done is likely to be given despite the fact that recording has failed completely.

However, with the present data storage device, the as-recorded C1 parity data and the reproduced C1 parity data are compared in addition to checking the number of occurrences of syndromes at the time of reproduction of the recorded recording tracks.

In general, the probability of coincidence of the C1 parities of two different blocks is decreased based on the number of bytes of the C1 parity data, becoming 1/256, 1/63556 and 1/16777216 for 1 byte, 2 bytes and 3 bytes, respectively.

Thus it is unnecessary to compare all of the 8 bytes of the C1 parity data and a portion of the C1 parity data, for example, one to three bytes, may be used for comparison as described above.

Therefore, with the present data storage device, if head clogging occurs only in the recording head, such that recording becomes totally infeasible, such as state may be detected and re-recording may be carried out for improving reliability in the read-after-write operation.

In the above embodiment, judgement as to whether correct recording has been done is given on the basis of the number of times error correction employing the parity data occurs. Alternatively, such judgement may also be given on the basis of the number of errors as detected using the parity data without performing error correction.

In short, the system controller 63 compares the number of errors detected at the time of reproduction of one-track blocks and supplied from the syndrome detection unit 62 as described above to a pre-set threshold value, such as 64. If the number of errors exceeds the threshold value, the system controller 63 deems that the recording track has not been recorded correctly and controls the recording/reproducing unit 30 and so forth to re-record the data in the recording track.

If the number of errors is smaller than the threshold value, the system controller 63 judges whether or not the C1 parity data stored in the RAM 61 at the time of recording is coincident with the reproduced C1 parity data. If the parities are not coincident, the system controller 63 causes re-recording of the data of the recording track.

Figure 8:
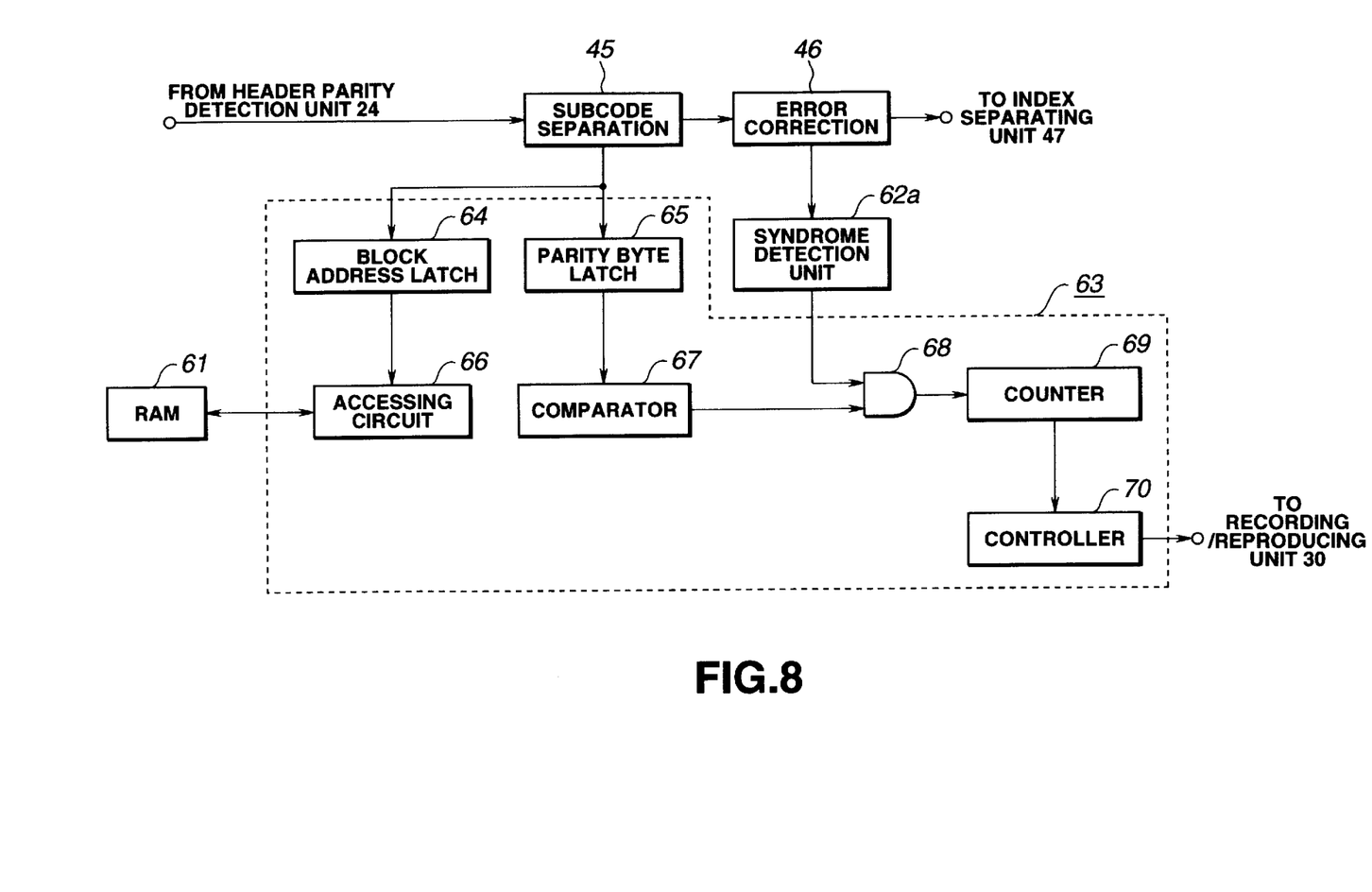
FIG. 8 is a block diagram having an arrangement of a portion of a data storage device according to an embodiment of the present invention.

Referring to FIG. 8, a modified embodiment of the present invention will now be explained. FIG. 8 specifically shows an arrangement of a portion of the data storage device shown n FIG. 1. The system controller 63 includes a latch circuit 64 for latching the block addresses read out by the sub-code separation unit 45 and a latch circuit 65 for latching part or all of the reproduced parity data bytes (C1 parity) from the subcode separation unit 45.

The system controller 63 also includes a RAM accessing circuit 66 for reading out the as-recorded C1 parity data stored in the RAM 61 in association with the block addresses latched by the latch circuit 64, and a comparator circuit 67 for comparing the C1 parity data held by the latch circuit 65 to the C1 parity data read out by the RAM accessing circuit 66.

The system controller 63 also includes an AND gate 68 for outputting a logical product of a detection output of a syndrome detection unit 62a, which is issued when error correction by the error correction unit 46 employing the C1 parity data has been done correctly, and an output of the comparator circuit 67. The system controller also includes a counter 69 for counting outputs of the AND gate 68 and a controller 70 for controlling the recording/reproducing unit based on the count value of the counter 69.

The operation characteristics of the above-described data storage device are now explained.

The block data, the block address of which has been parity-checked by the header parity detection unit 44, is freed of the sub-code by the sub-code separation unit 45, and has the block address latched by the latch circuit 64 in the system controller 63. In addition, the C1 parity data output by the sub-code separation unit 45 is also latched by the latch circuit 65 in the system controller 63.

In the system controller 63, the RAM accessing circuit 66 reads out the C1 parity data associated with the block address from the RAM 61 based on the block address held by the latch circuit 64. The C1 parity held by the latch circuit 65 is compared by the comparator circuit 67 with the pre-recording C1 parity data read out from the RAM 61. If part or all of the two C1 parity data is coincident with each other, the system controller causes a flag to be set and output to one of the input terminals of the AND gate. Independently of the above operation, the system controller 63 checks whether or not error correction has been done correctly in the error correction unit 46 using the C1 parity data. In distinction from the previous embodiment, the syndrome detection unit 62a detects the syndrome block by block and corrects errors using the detected syndromes. If error correction has been done, a flag is set and supplied to the opposite input terminal of the AND gate 68 within the system controller 63.

The system controller 63 recognizes that block data has been recorded correctly only when the coincidence of the C1 parity before and after recording by the AND gate 68 has been confirmed and error correction has been done, and accordingly outputs a signal for countup of the counter 69. The count number in the counter 69 is then incremented. The controller 70 then compares the count value of the counter 69 to a pre-set threshold value. If the count value, that is the number of correctly recorded blocks, is smaller than the threshold value, the track data is judged to be low in reliability, with the recording/reproducing unit 30 then managing control of a re-recording operation. If the count value exceeds the pre-set threshold value, the controller 700 controls the recording/reproducing unit 30 to reproduce the next track. The threshold value is set to, for example, 64, as in the previous embodiment.

By comparing part or all of the pre-recording parity bytes and post-recording parity bytes, as the error correction operation is going on, the recording data may be improved in reliability for realization of a prompt read-after-write operation.

Although the above embodiments are directed to a data storage device, the present invention may also be applied to other types of equipment, for example, a digital audio tape recorder or a digital video tape recorder, provided that the equipment are recording devices designed for digital recording with appendage of parity data for error detection or correction.

What is claimed is:

1. A data recording/reproducing apparatus comprising:

recording means for recording on a recording medium recording data and parity data for the recording data;

parity storage means for storing the parity data prior to being recorded on the recording medium;

reproducing means for reproducing the recording data and the parity data recorded on the recording medium;

error correction means for correcting the reproduced recording data based on the parity data reproduced by the reproducing means;

detection means for detecting a number of times error correction has been performed on the reproduced recording data by the error correction means when the recording data and the parity data are recorded by the recording means;

recording confirming means for comparing the detected number of times error correction has been performed to a pre-set threshold value and when the detected number of times error correction has been performed is less than said pre-set threshold, said recording confirming means compares the reproduced parity data to the parity data stored in the parity storage means in order to determine whether the recording by the recording means has been done correctly; and re-recording controlling means for controlling the recording means so that, if the recording confirming means does not determine that the recording by the recording means has been done correctly, the recording data is re-recorded by the recording means.

2. The data recording/reproducing apparatus as claimed in claim 1, wherein the recording medium is a tape-shaped recording medium, the recording means includes means for controlling running of the tape-shaped recording medium, and the recording means records the recording data and the parity data on a recording track formed on the recording medium at an angle inclined relative to a running direction of the tape-shaped recording medium.

3. The data recording/reproducing apparatus as claimed in claim 2, wherein the recording track includes a plurality of blocks, the recording means records the recording data and the parity data on the recording track from block to blocks and the detection means detects the number of times error correction has been performed for one-track recording data.

4. The data recording/reproducing apparatus as claimed in claim 3, wherein if the detected number of times error correction has been performed is less than a pre-set threshold value, the recording confirming means discriminates whether or not the reproduced parity data is coincident with the parity data stored in the parity storage means such that the recording confirming means determines that the recording has been done correctly if the two parity data coincide with each other.

5. A data recording/reproducing apparatus comprising:

recording means for recording on a tape-shaped recording medium recording data and parity data for the recording data;

parity storage means for storing the parity data prior to being recorded on the tape-shaped recording medium;

reproducing means for reproducing the recording data and the parity data recorded on the tape-shaped recording medium;

error correction means for correcting the reproduced recording data for errors based on the parity data reproduced by the reproducing means;

detection means for detecting a number of errors corrected by the error correction means on the recording data and the parity data reproduced by the reproducing means;

recording confirming means for comparing the detected number of corrected errors to a pre-set threshold value and when the detected number of corrected errors is less than said pre-set threshold, said recording confirming means compares the reproduced parity data to the parity data stored in the parity storage means in order to determine whether the recording by the recording means has been done correctly; and re-recording controlling means for controlling the recording means so that, if the recording confirming means does not determine that the recording by said recording means has been done correctly, the recording data is re-recorded by the recording means.

6. The data recording/reproducing apparatus as claimed in claim 5, wherein the recording means includes means for controlling running of the tape-shaped recording medium, and the recording means records the recording data and the parity data on a recording track formed on the recording medium at an angle inclined relative to a running direction of the tape-shaped recording medium.

7. The data recording/reproducing apparatus as claimed in claim 6, wherein the recording track includes a plurality of blocks, the recording means records the recording data and the parity data on the recording track from block to block, and the detection means detects the number of errors corrected for one-track recording data.

8. The data recording/reproducing apparatus as claimed in claim 7, wherein if the detected number of errors corrected is less than a pre-set threshold value, the recording confirming means discriminates whether or not the reproduced parity data is coincident with the parity data stored in the parity storage means such that the recording confirming means determines that the recording has been done correctly if the two parity data coincide with each other.

9. An apparatus for recording data on a tape-shaped recording medium along with parity data used for correcting the recording data for errors, and for reproducing the recording data from the tape-shaped recording medium as the recording data is corrected for errors based on the parity data, comprising:

recording means for recording a plurality of block data each including the recording data and the parity data;

storage means for storing the parity data prior to being recorded on the tape-shaped recording medium;

reproducing means for performing block based reproduction of the recording data and the parity data recorded on the tape-shaped recording medium;

error correction means for correcting the reproduced recording data based on the parity data reproduced by the reproducing means;

detection means for detecting whether the recording data has been corrected for errors by the error correction means; and control means for controlling the recording means based on results of detection by the detection means and when the number of times the recording data has been corrected for errors is less than a pre-set threshold, based on results of a comparison [by] of the reproduced parity data and the parity data stored in the storage means.

10. The apparatus as claimed in claim 9, wherein the control means recognizes that the recording data has been correctly recorded on the tape-shaped recording medium when it detects coincidence of at least portions of the two parity data and when the detection means determines that error correction has been done correctly.

11. The apparatus as claimed in claim 9, further comprising counting means for counting a number of blocks in reproduced one-track recording data for which the two parity data coincide with each other and which have been corrected for errors, wherein the control means controls the recording means to re-record the track if the number of blocks counted by the counting means is less than a pre-set threshold value.

12. The apparatus as claimed in claim 9, wherein the blocks contained in each track of the tape-shaped recording medium are composed of odd-numbered blocks and even-numbered blocks such that the parity data is included in one of the odd-numbered blocks and the even-numbered blocks.

* * * * *